F. PRICE.
ADJUSTABLE REAMER, TAP, AND THE LIKE.
APPLICATION FILED JULY 5, 1912.

1,062,114.

Patented May 20, 1913.
2 SHEETS—SHEET 1.

Witnesses.
Frank Edge
James Alexander Park

Inventor.
Frederick Price.

F. PRICE.
ADJUSTABLE REAMER, TAP, AND THE LIKE.
APPLICATION FILED JULY 5, 1912.

1,062,114.

Patented May 20, 1913.

2 SHEETS—SHEET 2.

Witnesses.
Frank Edge
James Alexander Park

Inventor.
Frederick Price

UNITED STATES PATENT OFFICE.

FREDERICK PRICE, OF COVENTRY, ENGLAND.

ADJUSTABLE REAMER, TAP, AND THE LIKE.

1,062,114.   Specification of Letters Patent.   Patented May 20, 1913.

Application filed July 5, 1912. Serial No. 707,838.

*To all whom it may concern:*

Be it known that I, FREDERICK PRICE, a British subject, residing at 41 Spencer avenue, Coventry, in the county of Warwickshire and country or England, have invented a new and useful Improvement in Adjustable Reamers, Taps, and the Like, of which the following is a specification.

My invention relates to improvements in adjustable reamers, taps, and the like, and is particularly applicable to that type of reamer, or tap, in which the blades, or cutting members, are separated from the holder or body, but capable of being adjusted for size, and locked in position in the said holder or body.

The object of my invention is to provide means whereby the blades, or cutting members, of an adjustable reamer, or tap, being perfectly flat on their two sides and bottom edges, may be securely locked in a desired position in the holder, or body, of such reamer, or tap. I attain this object by the construction of said reamers or taps as illustrated in the accompanying drawings, in which—

Figure 1:
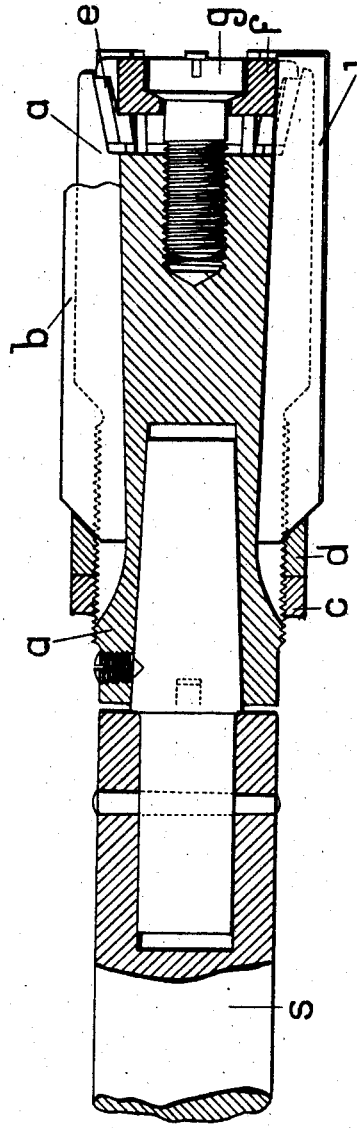
Figure 2:
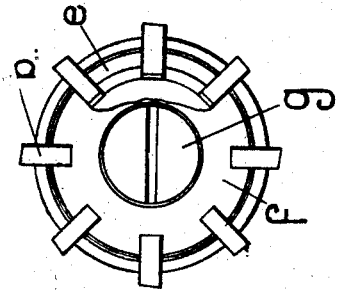
Figure 4:
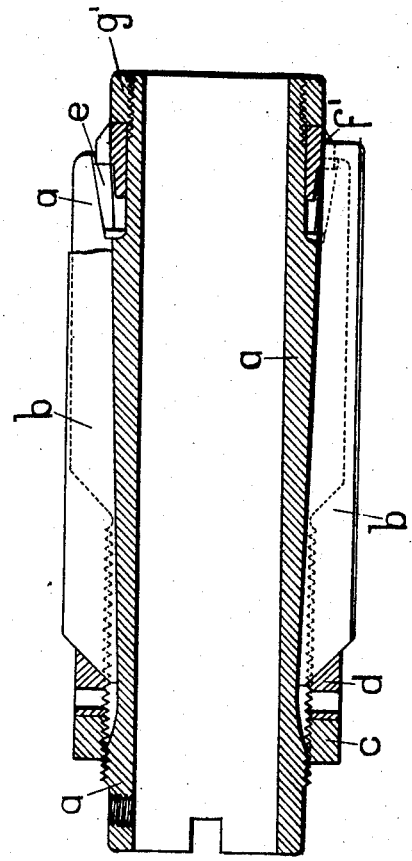
Figure 6:
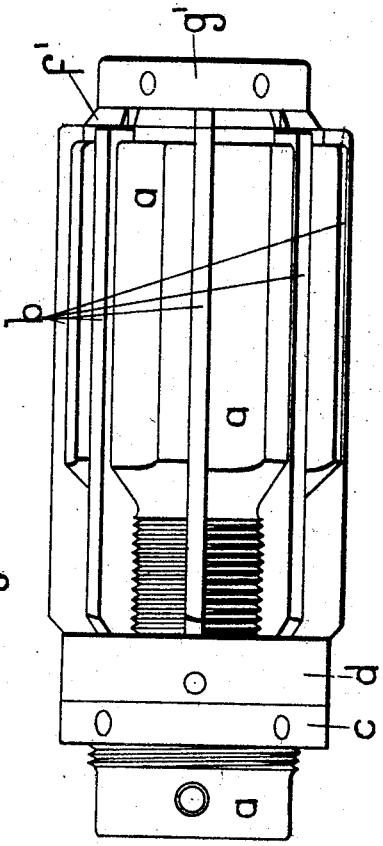
Figure 5:
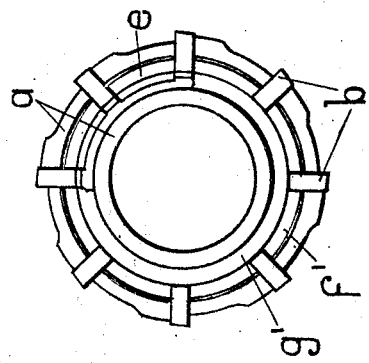

Figure 1 shows a section through an assembled reamer (of the hand and machine type); Fig. 2 an end view of the same, with a part of the securing washer cut away; and Fig. 3 an outside elevation. Fig. 4 shows a section through an assembled reamer of modified form (of the shell type); Fig. 5 an end view of the same, with a part of the securing collar cut away, and Fig. 6 an outside elevation.

In all of these several views, $a$ is the body, $b$ the blades, $c$ and $d$ back nuts, $e$ the locking wedges, $f$ the securing collar, $g$ the locking screw, and $s$ the shank.

In the modified form $f^1$ is the securing collar and $g^1$ is the locking nut.

The body $a$ is slotted to receive the blades $b$ (which may be of varying numbers according to the size of the tool), the slots being tapered deeper toward the back, or shank end, and the blades $b$ are a good sliding fit in said slots. At the front end of the body a taper recess is cut, at the bottom and in the center of which a hole is drilled and tapped for receiving the locking screw $g$ (in the case of solid hand and machine reamers, Figs. 1, 2 and 3). And in the case of shell reamers, Figs. 4, 5 and 6, a taper recess is cut in the end of the body, leaving a nipple solid with the same, onto which is screwed the locking nut $g^1$. The back nuts $c$ and $d$ fit the screw-threaded part of the body at the back, suitable means being provided for screwing them up as required. The front nut $d$ is coned at its front end to fit the ends of the blades, nut $c$ being for the purpose of locking nut $d$.

The blades are simply flat pieces of tool steel, tapered on their edges to suit the slots in the body, and beveled at their back ends to correspond with the back nut $d$. They are ground on their outer edges, after hardening, when in position. The locking wedges $e$ are formed by making a coned shaped sleeve to fit the taper recess in the front of the body, and parting it into as many pieces as there are slots in the body, by passing a saw through said sleeve of the same width as the slots, thereby forming small wedges which fit accurately between the blades.

Figure 3:
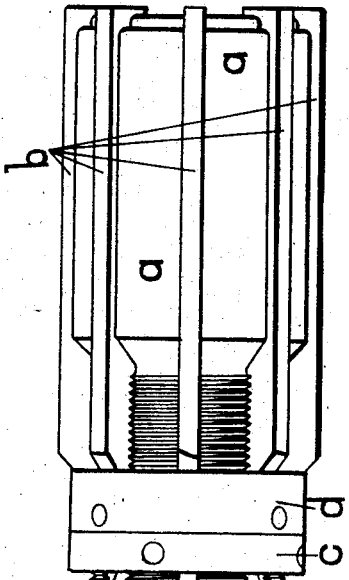

The shanks $s$ in the case of hand or machine reamers, Figs. 1, 2 and 3 (shell reamers, Figs. 4, 5 and 6, being for use with boring bars do not require shanks) are made separately and easily detachable, so that they may be changed at will, and the same reamer used for either hand or machine reaming, according to the shank on to which it is fixed.

In order to assemble the reamer from the various details here described, the blades $b$ are fitted into the body $a$ and driven back against the back nuts $c$ and $d$ which are run back on the thread as far as possible. The wedge pieces $e$ are then put into position between the blades, and the securing washer $f$ or collar $f^1$ tightened by the locking screw $g$ or locking nut $g^1$ forces the wedges $e$ down the cone, whereupon they grip the sides of the blades $b$ and force them in a downward and backward direction against the bottom of the slots and the back nuts $c$ and $d$, locking them in position.

When it is desired to adjust the blades, the locking screw $g$ or locking nut $g^1$ (as the case may be) is slacked back slightly, the blades $b$ are driven forward a little more than the desired amount, and the back nuts $c$ and $d$ brought up to position. The blades $b$ are then driven downward and back hard on to the back nut $d$ and re-locked by tightening the screw $g$ or nut $g^1$ (as the case may be). They are then ground, on the diameter and front of the blades, and backed off, and the tool is ready for use. Adjustable taps may also be made in this form, but when so made the fronts and faces of the cutting edges only are ground after adjustment.

I claim:—

In an adjustable reamer, or tap, the combination of a body having separate blades, with wedge pieces fitting into a taper recess in the body between the blades, and means for forcing said wedges into the taper recess in the body and securing the blades in any desired position in said body, substantially as described.

FREDERICK PRICE.

Witnesses:
 FRANK EDGE,
 JAMES ALEXANDER PARK.

Copies of this patent may be obtained for five cents each, by addressing the "Commissioner of Patents, Washington, D. C."